United States Patent [19]
Mannschke

[11] Patent Number: 4,522,461
[45] Date of Patent: Jun. 11, 1985

[54] OPTICAL MULTIPLEXER

[75] Inventor: Lothar Mannschke, Eckenhaid-Eckental, Fed. Rep. of Germany

[73] Assignee: U.S. Philips Corporation, New York, N.Y.

[21] Appl. No.: 492,105

[22] Filed: May 6, 1983

[30] Foreign Application Priority Data

May 13, 1982 [DE] Fed. Rep. of Germany ....... 3218023

[51] Int. Cl.³ .............................................. G02B 5/172
[52] U.S. Cl. ................. 350/96.18; 350/96.15; 370/1
[58] Field of Search ............... 350/96.15, 96.16, 96.18; 370/1, 3

[56] References Cited

U.S. PATENT DOCUMENTS

| 3,937,557 | 2/1976 | Mikon | 350/96 C |
| 4,213,677 | 7/1980 | Sugimoto et al. | 350/96.18 |
| 4,362,359 | 12/1982 | Dammann et al. | 350/96.18 X |

FOREIGN PATENT DOCUMENTS

| 3035858 | 5/1982 | Fed. Rep. of Germany ... 350/96.15 |
| 54-158238 | 12/1979 | Japan | 350/96.15 |
| 56-75602 | 6/1981 | Japan . |
| 56-70505 | 6/1981 | Japan . |
| 2028533 | 3/1980 | United Kingdom . |

OTHER PUBLICATIONS

Yamamoto et al., "A Large-Tolerant Single-Mode Optical Fiber Coupler with a Tapered Structure", *Proc. of IEEE*, Jun. 1976, pp. 1013–1014.

Primary Examiner—John Lee
Attorney, Agent, or Firm—Marc D. Schechter

[57] ABSTRACT

Radiations of different input light-wave conductors which are provided with tapering parts and are coupled at the center of an end face of a GRIN-rod lens are introduced by this lens into an output light-wave conductor. During the radiation conduction, the radiation emanating at the area of the tapering parts is also taken into account.

8 Claims, 1 Drawing Figure

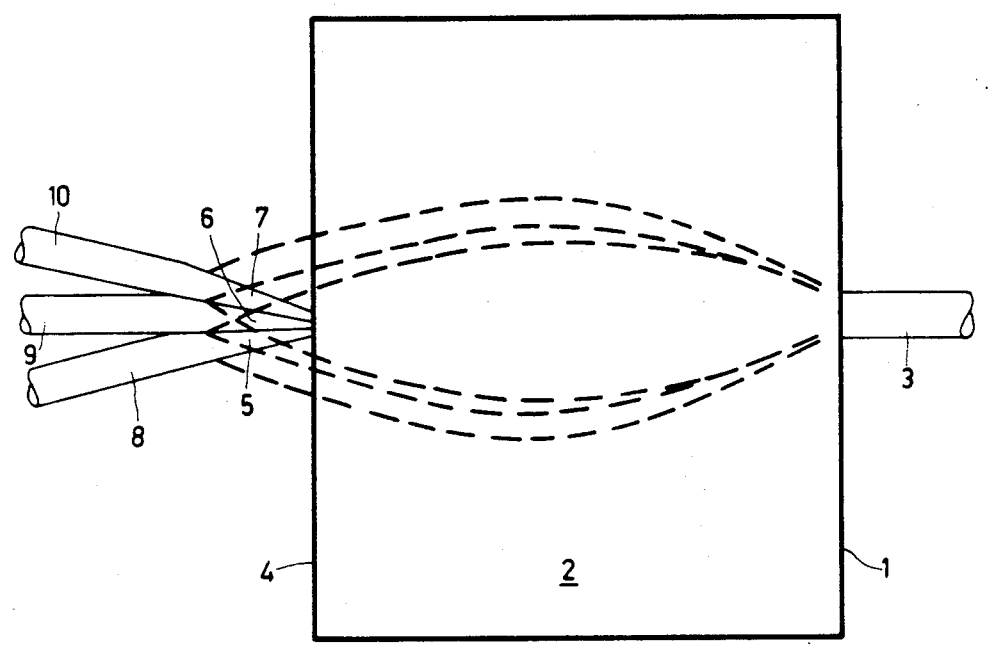

OPTICAL MULTIPLEXER

BACKGROUND OF THE INVENTION

The invention relates to an optical multiplexer comprising at least one graded-index rod lens, which carries input light-wave conductors which merge onto an end face and whose radiations are passed into an area at which the radiations are received by an output light-wave conductor. Such multiplexers are used in optical data communication systems.

In a star coupler known from U.S. Pat. No. 3,937,557, in an inverse mode of operation several light-wave conductors (LWC's) are coupled each through a graded-index rod lens (GRIN-rod lens) to several LWC's of a common GRIN-rod lens. Such a star coupler cannot be used as a multiplexer without further expedients.

SUMMARY OF THE INVENTION

The invention has for its object to provide a multiplexer operating with minimal losses and comprising a GRIN-rod lens, in which it is sufficient to use a radiation-conducting system that can be composed of a minimum number of constructional elements.

In a multiplexer of the kind mentioned in the opening paragraph, this is achieved in that the input light-wave conductors are each provided with a tapering part and in that the tips of the tapering parts are arranged at the centre of the end face of the GRIN-rod lens.

The invention is based on the recognition of the fact that in a restriction of a light-wave conductor designated as "tapering part" the numerical aperture and the standardized variation of the refractive index remain unchanged, but that the diameter of this conductor decreases constantly.

BRIEF DESCRIPTION OF THE DRAWING

The invention and the advantageous embodiments apparent from the claims are described more fully with reference to an example shown diagrammatically in the drawing.

The drawing is a schematic representation, to an enlarged scale, illustrating the optical multiplexer in accordance with the invention.

DESCRIPTION OF THE PREFERRED EMBODIMENTS

On an end face 1 of a GRIN-rod lens 2, an LWC 3 conveying output radiation is coupled at the center. On the opposite end face 4, the tips of the tapering parts 5, 6, 7 of the input LWC's 8, 9, 10 are located at the center.

In the core piece of the multiplexer (the GRIN-rod lens 2) the radiations originating from the LWC's 8, 9, 10 are guided to the LWC 3 through the areas indicated by broken lines. The form of the LWC's 8, 9, 10 with tapering parts 5, 6, 7 is of particular importance for the radiation conduction because all the input LWC's can be coupled on a particularly small surface.

With a decreasing LWC diameter due to restriction (tapering), the number of modes of propagation is reduced. It is then even possible that also the fundamental mode of a transmitted radiation can no longer be propagated. Radiation which is no longer conducted emanates from the tapering part and forms after passing through the likewise restricted LWC sheath a radiation cone which arrives at the GRIN-rod lens 2. The emanated radiation is conducted through the preferably index-matched material surrounding the tapering parts. The cones of the no longer conducted radiation of all the restricted LWC's mutually penetrate into each other. As a result, the radiations are combined with minimal losses. Radiation thus combined and partly diverging is focussed by means of the GRIN-rod lens 2 into the output LWC 3.

In order to introduce the radiation into the output LWC 3, the following factors are taken into account for the measurement of the length of the GRIN-rod lens 2:

Acceptance range of the output LWC 3 determined by the core diameter, the gradient profile and the numerical aperture, emission range of the input LWC's 8, 9, 10 determined by the core diameter, the gradient profile and the numerical aperture of these LWC's as well as the length and shape of the tapering parts 5, 6, 7 (tapering parts must not have exactly the form of a truncated cone), imaging properties of the GRIN-rod lens 2, determined by the diameter, the profile factor and the central refractive index in dependence upon the length of the GRIN-rod lens: the length of the GRIN-rod lens then lies between ¼ radiation period (0.25 pitch) plus at least 10% and 0.5 pitch minus 10% or deviates by at least 10% in GRIN-rod lenses having a length of n times 0.25 pitch, n being an integer.

In a specific example, the dimensioning is as follows:

Output LWC having a core diameter of 50 $\mu$m, gradient profile $\alpha \approx 2$, numerical aperture $\approx 0.2$, input LWC's having a core diameter of 30 $\mu$m, a gradient profile $\alpha \approx 2$ and a numerical aperture 0.2 with tapering parts in a form like a truncated cone of approximately 7 mm length and GRIN-rod lens with a length of 0.29 p (pitch).

The tips of the tapering parts are cast, ground and adhered to the end face in common alignment.

In another version of a multiplexer, also two consecutively arranged GRIN-rod lenses having different properties may be used for radiation conduction. For example, a system of GRIN-rod lenses can be composed, in which one GRIN lens having a low beam divergence (marketed under the designation SLS-lens) collimates and the other lens having a high beam divergence (marketed under the designation SLW-lens) focusses.

What is claimed is:

1. An optical multiplexer comprising:
  a graded-index rod lens having a first end face and a second opposed end face;
  an output lightwave conductor positioned at said second end face;
  a plurality of input lightwave conductors merging onto said first end face of said graded-index rod lens, each said input lightwave conductor having a tapered portion at the end thereof, the tips of the tapered end portions centrally abutting said first end face of said graded-index rod lens, light transmitted from said tips passing through said graded-index rod lens to said output lightwave conductor.

2. An optical multiplexer as claimed in claim 1, wherein said input conductors are tapered to produce light emanation from the lateral tapered surfaces, said light emanating from the lateral surfaces of said tapered portions of said input lightwave conductors impinging on an area of said first end face of said graded-index rod lens, a predetermined length of said graded-index rod lens bringing said light emanating from said lateral surfaces of said tapered portions to said output lightwave conductor at said second end face of said lens.

3. An optical multiplexer as claimed in claim 1 or 2 wherein the core diameters of said input lightwave conductors are reduced by at least 20% by tapering.

4. An optical multiplexer as claimed in claim 3, wherein the length of said graded-index rod lens is larger than a quarter of the radiation period (pitch) and deviates by at least 10% from n times a quarter of the radiation period, n being an integer.

5. An optical multiplexer as claimed in claim 1 or 2, wherein the length of said graded-index rod lens is larger than a quarter of the radiation perod (pitch) and deviates by at least 10% from n times a quarter of the radiation period, n being an integer.

6. An optical multiplexer as claimed in claim 1, wherein said input lightwave conductors are arranged cencentrically with the optical axis of said graded-index rod lens.

7. An optical multiplexer as claimed in claim 6, wherein said tapered portions of said input lightwave conductors are the product of common casting, grinding and polishing.

8. An optical multiplexer as claimed in claim 1, and further comprising an additional graded-index rod lens, said rod lenses having different optical properties one from the other, said lenses being arranged consecutively for light transmission, said additional lens having a low beam divergence for collimating light.

* * * * *